(12) United States Patent
Dixit et al.

(10) Patent No.: US 11,822,120 B2
(45) Date of Patent: Nov. 21, 2023

(54) OPTICAL COMPONENTS WITH ENHANCED HEAT DISSIPATION

(71) Applicant: GlobalFoundries U.S. Inc., Malta, NY (US)

(72) Inventors: Hemant Dixit, Halfmoon, NY (US); Yusheng Bian, Ballston Lake, NY (US); Theodore Letavic, Putnam Valley, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/679,405

(22) Filed: Feb. 24, 2022

(65) Prior Publication Data
US 2023/0266529 A1    Aug. 24, 2023

(51) Int. Cl.
*G02B 6/122* (2006.01)
*F21V 8/00* (2006.01)
*G02B 6/43* (2006.01)

(52) U.S. Cl.
CPC .......... *G02B 6/122* (2013.01); *G02B 6/0026* (2013.01); *G02B 6/43* (2013.01)

(58) Field of Classification Search
CPC ......... G02B 6/0026; G02B 6/122; G02B 6/43
See application file for complete search history.

(56) References Cited

U.S. PATENT DOCUMENTS

| 6,847,748 B2 | 1/2005 | Benzoni et al. |
| 9,581,761 B2* | 2/2017 | Liang ..................... G02B 6/122 |
| 10,283,931 B2* | 5/2019 | Caër ..................... H01S 3/2375 |
| 2012/0189243 A1* | 7/2012 | Barowski ............. G06F 30/394 |
| | | 385/14 |
| 2016/0363728 A1 | 12/2016 | Wang et al. |
| 2017/0371099 A1 | 12/2017 | Chantre et al. |

FOREIGN PATENT DOCUMENTS

| AU | 2003278910 A1 | 5/2004 |
| JP | 2007078861 A | 3/2007 |
| JP | 201892016 A | 6/2018 |

OTHER PUBLICATIONS

Adil Masood et al., "Fabrication and characterization of CMOS-compatible integrated tungsten heaters for thermo-optic tuning in silicon photonics devices," Optical Materials Express, vol. 4, No. 7, 1383-1388 (Jul. 1, 2014).

(Continued)

*Primary Examiner* — Daniel Petkovsek
(74) *Attorney, Agent, or Firm* — Thompson Hine LLP; Anthony Canale

(57) ABSTRACT

Structures including an optical component and methods of fabricating a structure including an optical component. The structure includes a waveguide core and a back-end-of-line stack including a first metallization level, a second metallization level, and a heat sink having a metal feature in the second metallization level. The heat sink is positioned adjacent to a section of the waveguide core. The first metallization level including a dielectric layer positioned between the metal feature and the section of the waveguide core.

20 Claims, 8 Drawing Sheets

(56) References Cited

OTHER PUBLICATIONS

Shiyang Zhu et al., "Performance of ultracompact copper-capped silicon hybrid plasmonic waveguide-ring resonators at telecom wavelengths," Optics Express, vol. 20, No. 14, 15232-15246 (Jul. 2, 2012).

K. Giewont et al., "300-mm Monolithic Silicon Photonics Foundry Technology," in IEEE Journal of Selected Topics in Quantum Electronics, vol. 25, No. 5, pp. 1-11, Art No. 8200611, doi: 10.1109/JSTQE.2019.2908790 (Sep.-Oct. 2019).

Y. Bian et al., "Monolithically integrated silicon nitride platform," 2021 Optical Fiber Communications Conference and Exhibition (OFC), pp. 1-3 (2021).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

H. Dixit et al., "Photonic Devices Integrated With Thermally Conductive Layers" filed on Jan. 27, 2022 as a U.S. Appl. No. 17/649,191.

T. Letavic et al., "Thermal Management of an Optical Component for Temperature Control" filed on Feb. 24, 2022 as a U.S. Appl. No. 17/679,431.

Y. Bian et al., "Thermally-Conductive Features Positioned Adjacent to an Optical Component" filed on Feb. 24, 2022 as a U.S. Appl. No. 17/679,470.

European Patent Office, Extended European Search Report and Written Opinion issued in European Patent Application No. 22200133.1 dated Jun. 30, 2023 (8 pages).

* cited by examiner

OPTICAL COMPONENTS WITH ENHANCED HEAT DISSIPATION

BACKGROUND

The disclosure relates to photonics chips and, more specifically, to structures including an optical component and methods of fabricating a structure including an optical component.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Among other factors, layout area, cost, and operational overhead may be reduced by the integration of both types of components on the same chip.

An edge coupler, also known as a spot-size converter, is commonly used for coupling light of a given mode from a light source, such as a laser or an optical fiber, to optical components on the photonics chip. The edge coupler may include a section of a waveguide core that defines an inverse taper having a tip. In the edge coupler construction, the narrow end of the inverse taper provides a facet at the tip that is positioned adjacent to the light source, and the wide end of the inverse taper is connected with another section of the waveguide core that routes the light to the optical components of the photonics chip.

The gradually-varying cross-sectional area of the inverse taper supports mode transformation and mode size variation associated with mode conversion when light is transferred from the light source to the edge coupler. The tip of the inverse taper is unable to fully confine the incident mode received from the light source because the cross-sectional area of the tip is considerably smaller than the mode size. Consequently, a significant percentage of the electromagnetic field of the incident mode is distributed about the tip of the inverse taper. As its width increases, the inverse taper can support the entire incident mode and confine the electromagnetic field.

Conventional edge couplers may be susceptible to power-related damage because of poor power handling capability, which adversely impacts reliability. Particularly susceptible to power-related damage are silicon waveguide cores that are surrounded by low-index cladding containing dielectric materials characterized by poor thermal conductivity. At high optical input powers, non-linear absorption effects in silicon waveguide cores may result in severe thermal heating, and even physical melting, because of an inability to adequately dissipate the generated heat.

Improved structures including an optical component and methods of fabricating a structure including an optical component are needed.

SUMMARY

In an embodiment of the invention, a structure includes a waveguide core and a back-end-of-line stack including a first metallization level, a second metallization level, and a heat sink having a metal feature in the second metallization level. The heat sink is positioned adjacent to a section of the waveguide core. The first metallization level includes a dielectric layer positioned between the metal feature and the section of the waveguide core.

In an embodiment of the invention, a structure includes a substrate, an optical component, a dielectric layer positioned in a vertical direction between the optical component and the substrate, a back-end-of-line stack on the dielectric layer, and a heat sink including a metal feature extending through the back-end-of-line stack and the dielectric layer to the substrate. The metal feature is laterally positioned adjacent to the optical component.

In an embodiment of the invention, a method forming a waveguide core, and forming a back-end-of-line stack including a first metallization level, a second metallization level, and a heat sink having a metal feature in the second metallization level. The heat sink is positioned adjacent to a section of the waveguide core, and the first metallization level includes a dielectric layer positioned between the metal feature and the section of the waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
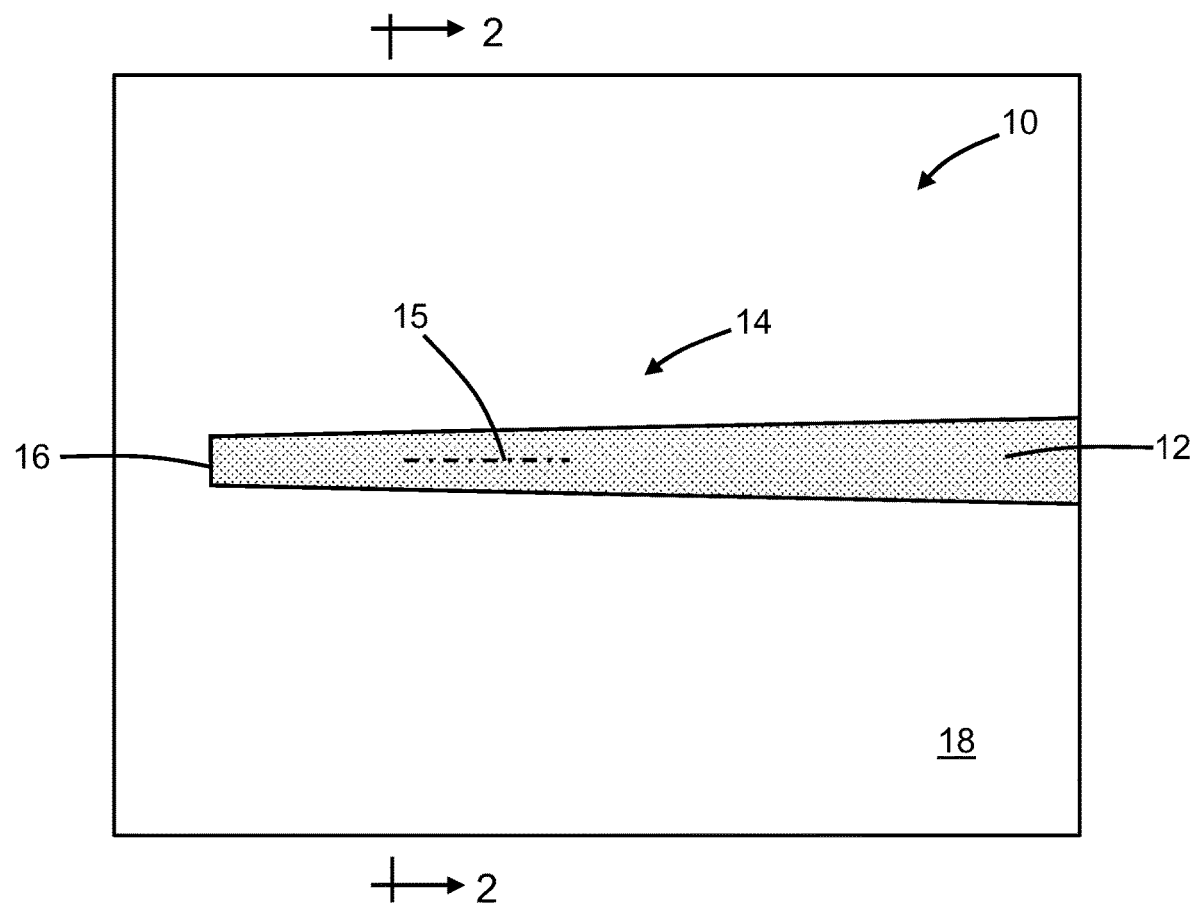
FIG. 1 is a top view of a structure at an initial fabrication stage of a processing method in accordance with embodiments of the invention.
Figure 2:
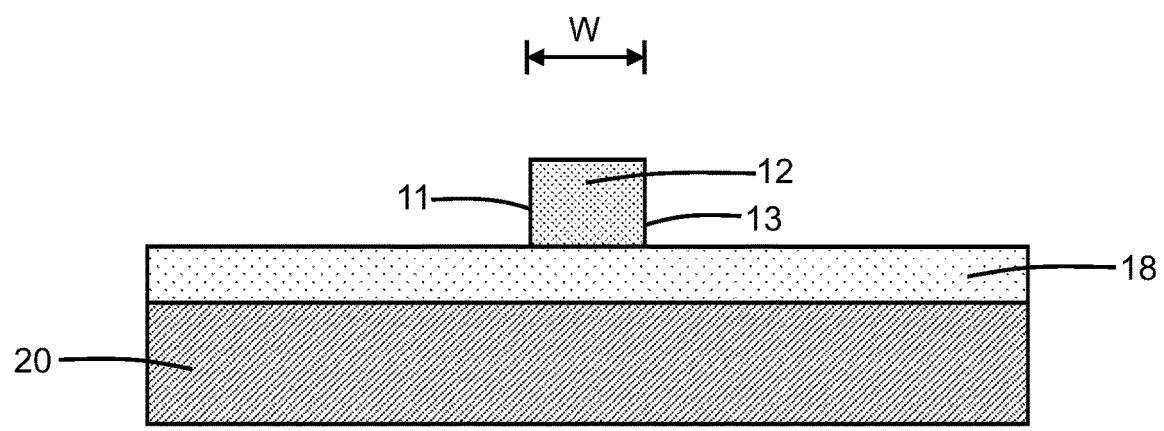
FIG. 2 is a cross-sectional view of the structure taken generally along line 2-2 in FIG. 1.

With reference to FIGS. 1, 2 and in accordance with embodiments of the invention, a structure 10 includes a waveguide core 12 as an optical component. In a representative embodiment, the waveguide core 12 may be an edge coupler in which the waveguide core 12 includes an inverse taper 14 and has an end surface defining a facet 16. The inverse taper 14 increases in width W1 with increasing distance from the facet 16. An inverse taper refers to a tapered section of a waveguide core characterized by a gradual increase in width along a mode propagation direction. The waveguide core 12 may be aligned along a longitudinal axis 15, and the waveguide core 12 may have opposite sidewalls 11, 13 that converge at the facet 16.

The waveguide core 12 may be positioned over a dielectric layer 18 and a substrate 20. In an embodiment, the dielectric layer 18 may be comprised of a dielectric material, such as silicon dioxide, and the substrate 20 may be comprised of a semiconductor material, such as single-crystal silicon. In an embodiment, the dielectric layer 18 may be a buried oxide layer of a silicon-on-insulator substrate, and the dielectric layer 18 may separate the waveguide core 12 from the substrate 20. The waveguide core 12 may be comprised of a semiconductor material, such as single-crystal silicon. In an embodiment, the waveguide core 12 may be formed by patterning a single-crystal silicon device layer of a silicon-on-insulator substrate with lithography and etching processes, and the dielectric layer 18 may operate as an etch stop when patterning the waveguide core 12.

In the representative embodiment, the waveguide core 12 is embodied in a ridge waveguide core. In an alternative embodiment, the waveguide core 12 may be embodied in a rib waveguide core. In an alternative embodiment, the waveguide core 12 may be embodied in a slot waveguide core. In the representative embodiment, the waveguide core 12 is linear or straight. In an alternative embodiment, the waveguide core 12 may be curved. In an alternative embodiment, the waveguide core 12 may be non-tapered. In embodiments, the waveguide core 12 may be part of another optical component such as a polarization mode converter, an optical coupler, a multi-mode interference region, etc.

Figure 3:
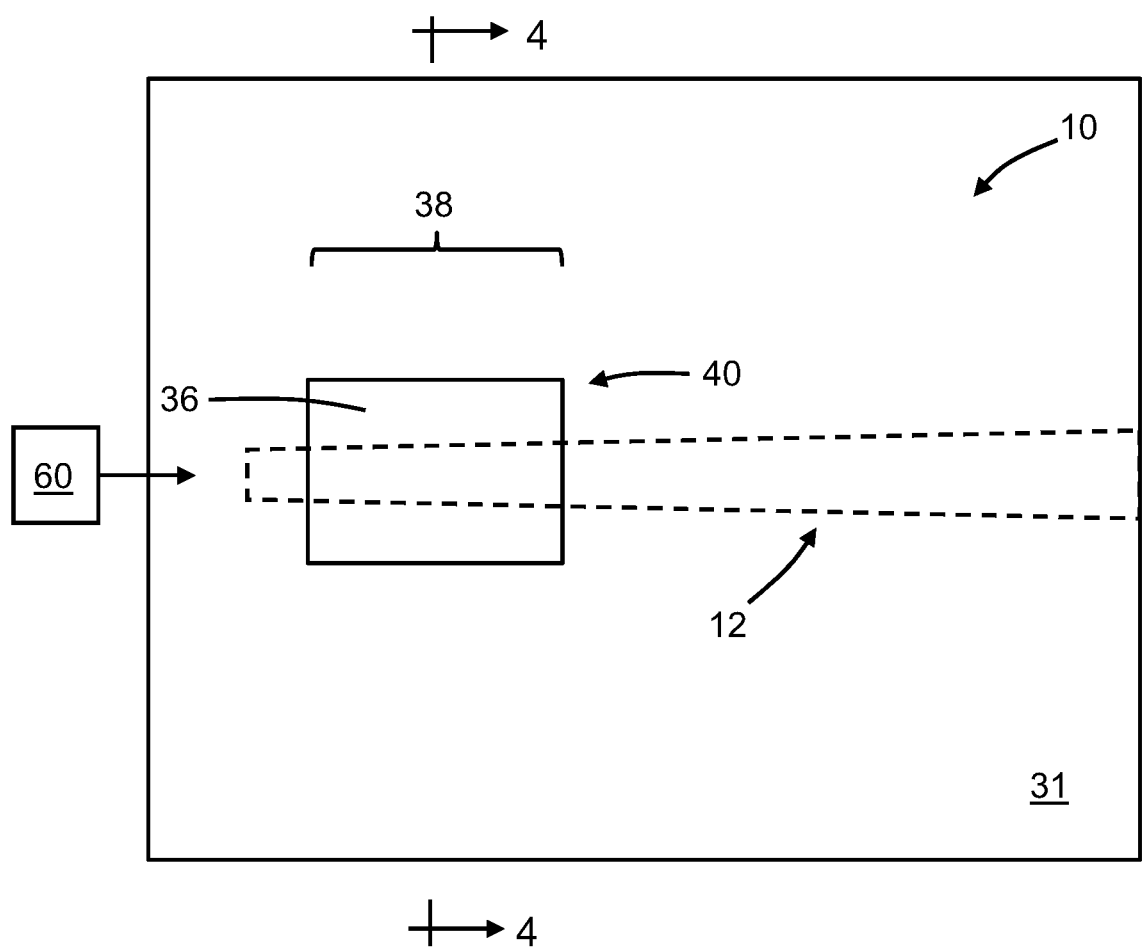
FIG. 3 is a top view of the structure at a fabrication stage of the processing method subsequent to FIG. 1.
Figure 4:
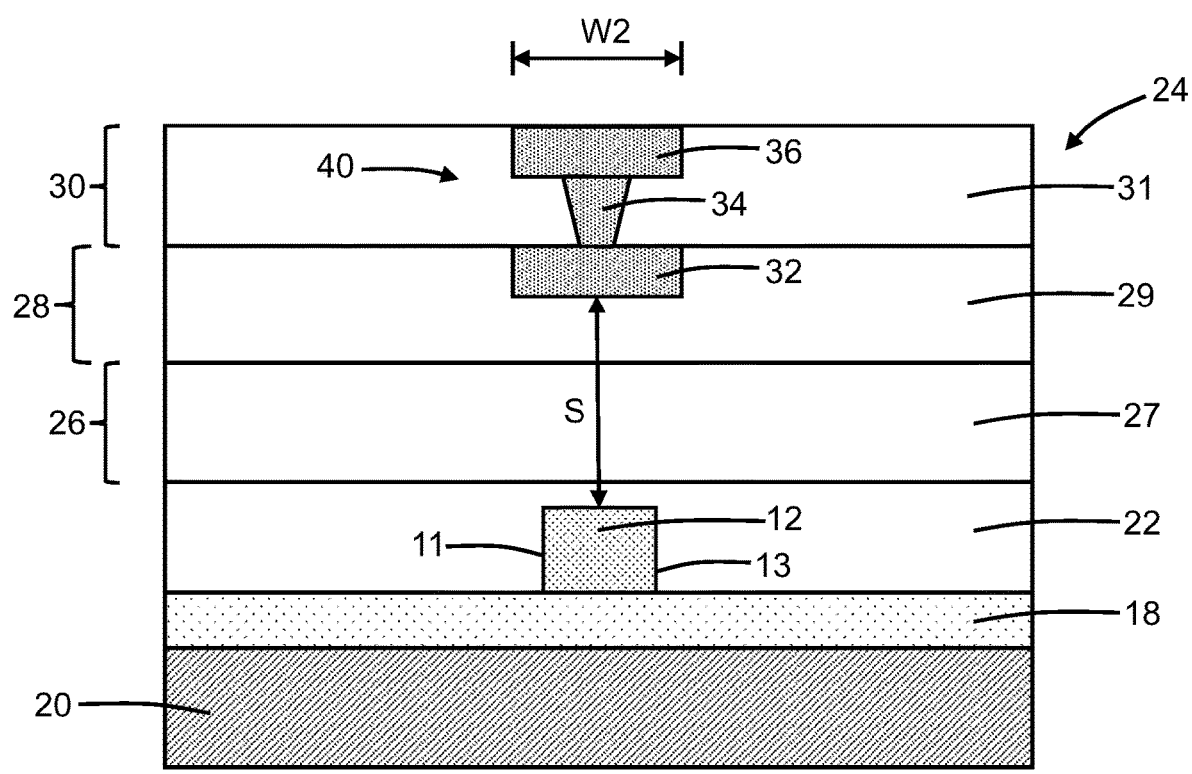
FIG. 4 is a cross-sectional view of the structure taken generally along line 4-4 in FIG. 3.

With reference to FIGS. 3, 4 in which like reference numerals refer to like features in FIGS. 1, 2 and at a subsequent fabrication stage, a dielectric layer 22 is formed over the waveguide core 12 and dielectric layer 18. The dielectric layer 22 may be comprised of a dielectric material, such as silicon dioxide. The waveguide core 12 is embedded in the dielectric layer 22.

A back-end-of-line stack 24 is formed over the dielectric layer 22. The back-end-of-line stack 24 may include a metallization level 26, a metallization level 28, and a metallization level 30. The metallization level 26 is arranged in a vertical direction between the waveguide core 12 and the metallization level 28. The metallization level 28 is arranged in a vertical direction between the metallization level 26 and the metallization level 30. The metallization level 26 may include an interlayer dielectric layer 27, the metallization level 28 may include an interlayer dielectric layer 29, and the metallization level 30 may include an interlayer dielectric layer 31. In an embodiment, the interlayer dielectric layers 27, 29, 31 may be comprised of silicon dioxide.

A metal feature 32 may be formed in the interlayer dielectric layer 29 of the metallization level 28, a metal feature 34 may be formed in the interlayer dielectric layer 31 of the metallization level 30, and a metal feature 36 may be formed that connects the metal feature 32 to the metal feature 34. The metal features 32, 34, 36, which are arranged in a stack, may be positioned to overlap with a section 38 of the waveguide core 12. The overlap is characterized by a portion of each of the metal features 32, 34, 36 being laterally positioned between the sidewalls 11, 13 of the waveguide core 12. In an embodiment, the section 38 of the waveguide core 12 may be fully overlapped by the metal features 32, 34, 36. In an embodiment, the section 38 of the waveguide core 12 may have a length in a range of 20 microns to 30 microns.

The interlayer dielectric layer 27 of the metallization level 26 may be locally free of metal features between the section 38 of the waveguide core 12 and the metal features 32, 34, 36. In an embodiment, the metallization level 26 may be the closest metallization level of the back-end-of-line stack 24 to the waveguide core 12, and the metallization level 28 may be separated from the waveguide core 12 by only the metallization level 26. In an alternative embodiment, the metallization level 26 may be the closest metallization level of the back-end-of-line stack 24 to the waveguide core 12, and the dielectric layers of additional metallization levels each locally free of metal features may be positioned between the metallization level 28 and the metallization level 26. In an embodiment, the metal features 32, 34, 36 are not connected to the waveguide core 12 or the substrate 20, and the metal features 32, 34, 36 are not connected to other metal features in overlying metallization levels (not shown) of the back-end-of-line stack 24.

The metal features 32, 34, 36 may define a heat sink 40 that is positioned adjacent to the section 38 of the waveguide core 12. The metal features 32, 34, 36 may be formed by patterning, deposition, and polishing techniques characteristic of a damascene process. Specifically, the interlayer dielectric layers 27, 29 may be deposited and patterned using lithography and etching processes to define trenches that are filled by a planarized metal (e.g., copper) to define the metal features 32, 34 and to define a via opening that is filled by the metal to define the metal feature 36. In an embodiment, the metal features 32, 34, 36 may be spaced in a vertical direction from the section 38 of the waveguide core 12 by a spacing S, which may range from about 500 nanometers to about 1 micron. In an embodiment, the metal feature 32 and the metal feature 36 may have a width W2 that is greater than the width W1 of the section 38 of the waveguide core 12. For example, the width W2 may be equal to 1.5 microns.

In the representative embodiment, the metal features 32, 34, 36 are linear or straight. In an alternative embodiment, the metal features 32, 34, 36 may be curved. In an alternative embodiment, the waveguide core 12 and the metal features 32, 34, 36 may be curved.

Light (e.g., laser light) may be directed from a light source 60 toward the facet 16 of the waveguide core 12. The light may have a given wavelength, intensity, mode shape, and mode size, and the edge coupler providing the representative optical component may provide spot size conversion for the light. In an embodiment, the light source 60 may be a semiconductor laser, and the semiconductor laser may be positioned inside a cavity formed in the substrate 20 and attached to the substrate 20.

The structure 10, in any of its embodiments described herein, may be integrated into a photonics chip that includes electronic components and additional optical components. For example, the electronic components may include field-effect transistors that are fabricated by CMOS processing.

The structure 10 provides one or more pathways for heat transfer to cool the waveguide core 12 and thereby reduce the susceptibility of the waveguide core 12 to possible optical power-related damage from, for example, high-power laser light. In particular, the heat sink 40 efficiently absorbs heat energy generated by light propagating in the waveguide core 12 and conducted as a heat flux through the intervening dielectric material to the metal features 32, 34, 36. For example, the heat sink 40 may prevent power-related damage to the section 38 of the waveguide core 12 in the representative embodiment of an edge coupler receiving high-power laser light from the light source 60.

Figure 5:
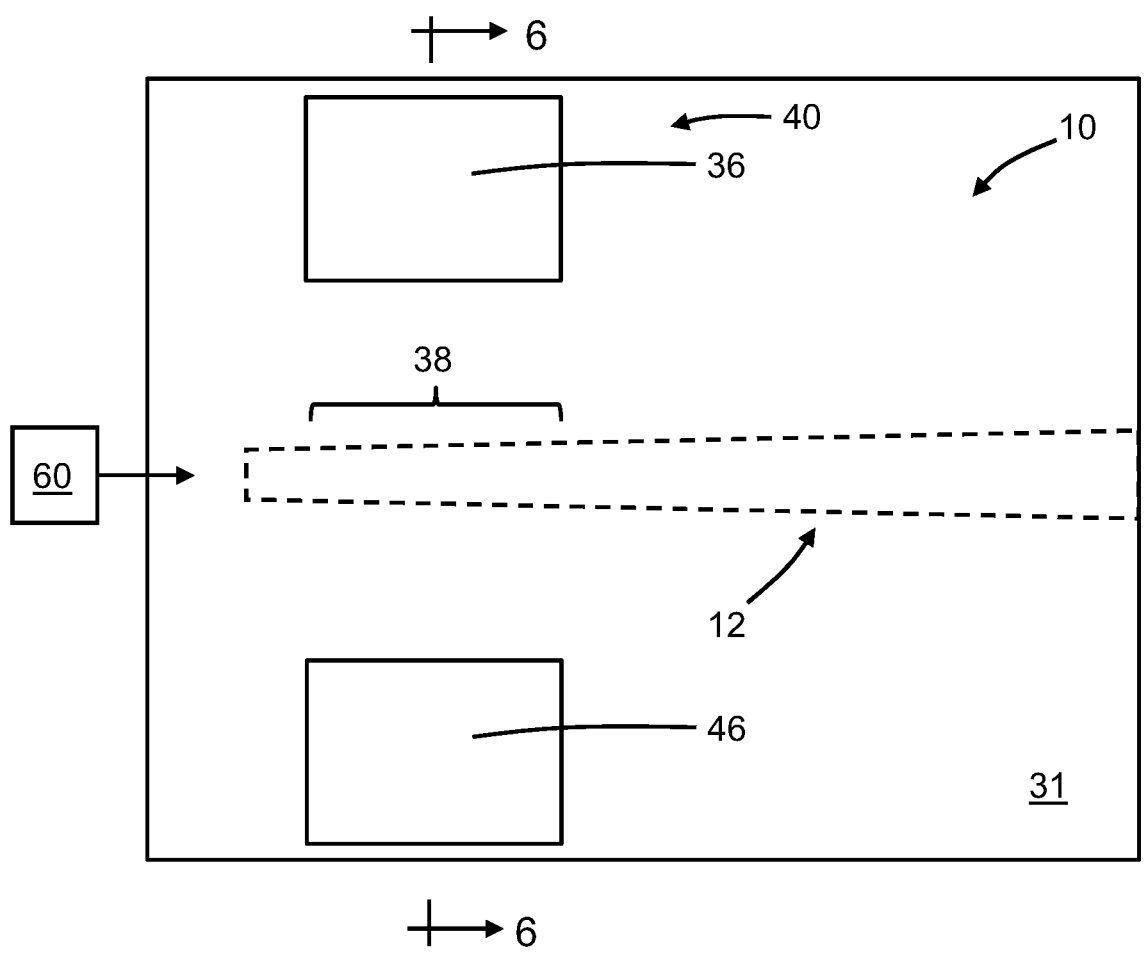
FIG. 5 is a top view of a structure in accordance with alternative embodiments of the invention.
Figure 6:
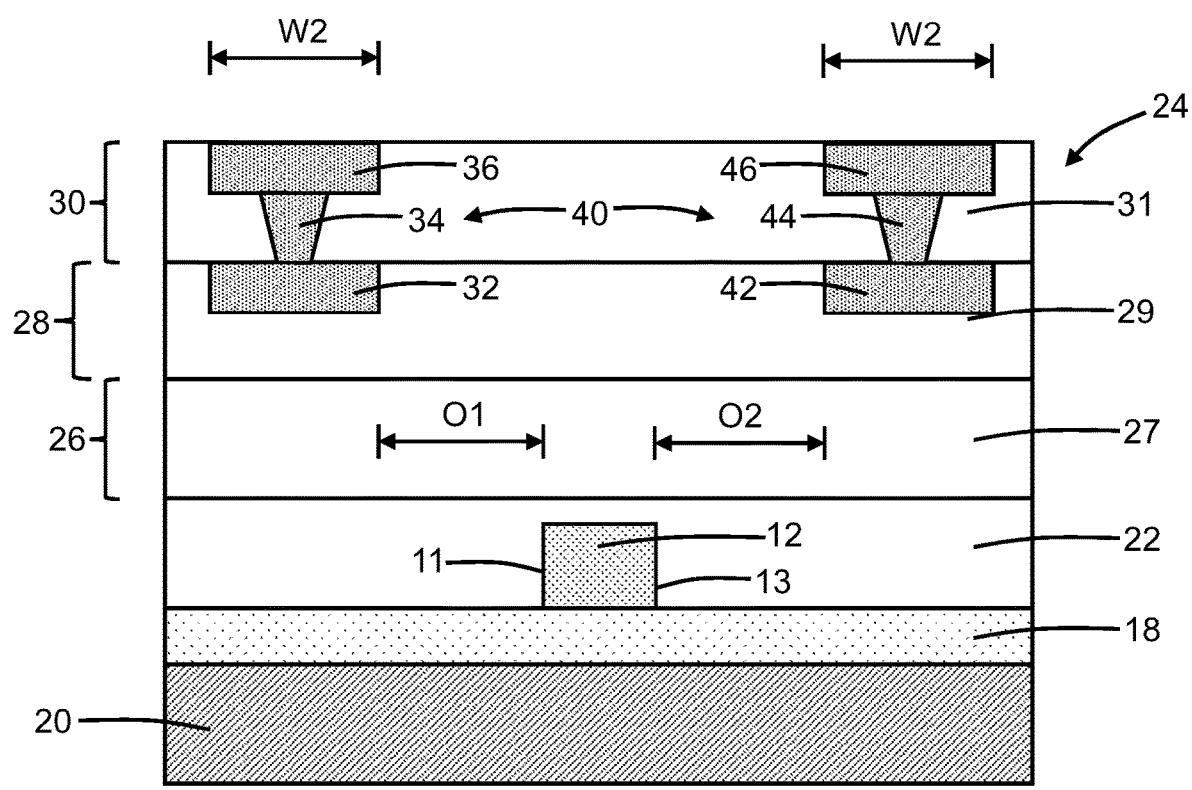
FIG. 6 is a cross-sectional view of the structure taken generally along line 6-6 in FIG. 5.

With reference to FIGS. 5, 6 and in accordance with alternative embodiments of the invention, additional metal features 42, 44, 46 similar to the metal features 32, 34, 36 may be formed in the metallization levels 28, 30 in order to expand the extent of the heat sink 40. In an embodiment, the set of metal features 32, 34, 36 and the set of metal features 42, 44, 46 may be laterally offset in opposite directions relative to the respective sidewalls 11, 13 of the waveguide core 12. In an embodiment, the offset O1 of the set of metal features 32, 34, 36 and the offset O2 of the set of metal features 42, 44, 46 may be equal such that the waveguide core 12 is symmetrically positioned between the set of metal features 32, 34, 36 and the set of metal features 42, 44, 46.

In an embodiment, the set of metal features 32, 34, 36 may be offset to have a non-overlapping arrangement with the waveguide core 12, and the set of metal features 42, 44, 46 may also be offset to have a non-overlapping arrangement with the waveguide core 12. In an embodiment, the offsets O1, O2 may each be less than the width W2 of the metal features 32, 36 and the metal features 42, 46. In an embodiment, the metal features 32, 34, 36 may be disconnected from the metal features 42, 44, 46.

In the representative embodiment, the metal features 32, 34, 36 and the metal features 42, 44, 46 are linear or straight. In an alternative embodiment, the metal features 32, 34, 36 and the metal features 42, 44, 46 may be curved. In an alternative embodiment, the waveguide core 12, the metal features 32, 34, 36, and the metal features 42, 44, 46 may be curved.

Figure 7:
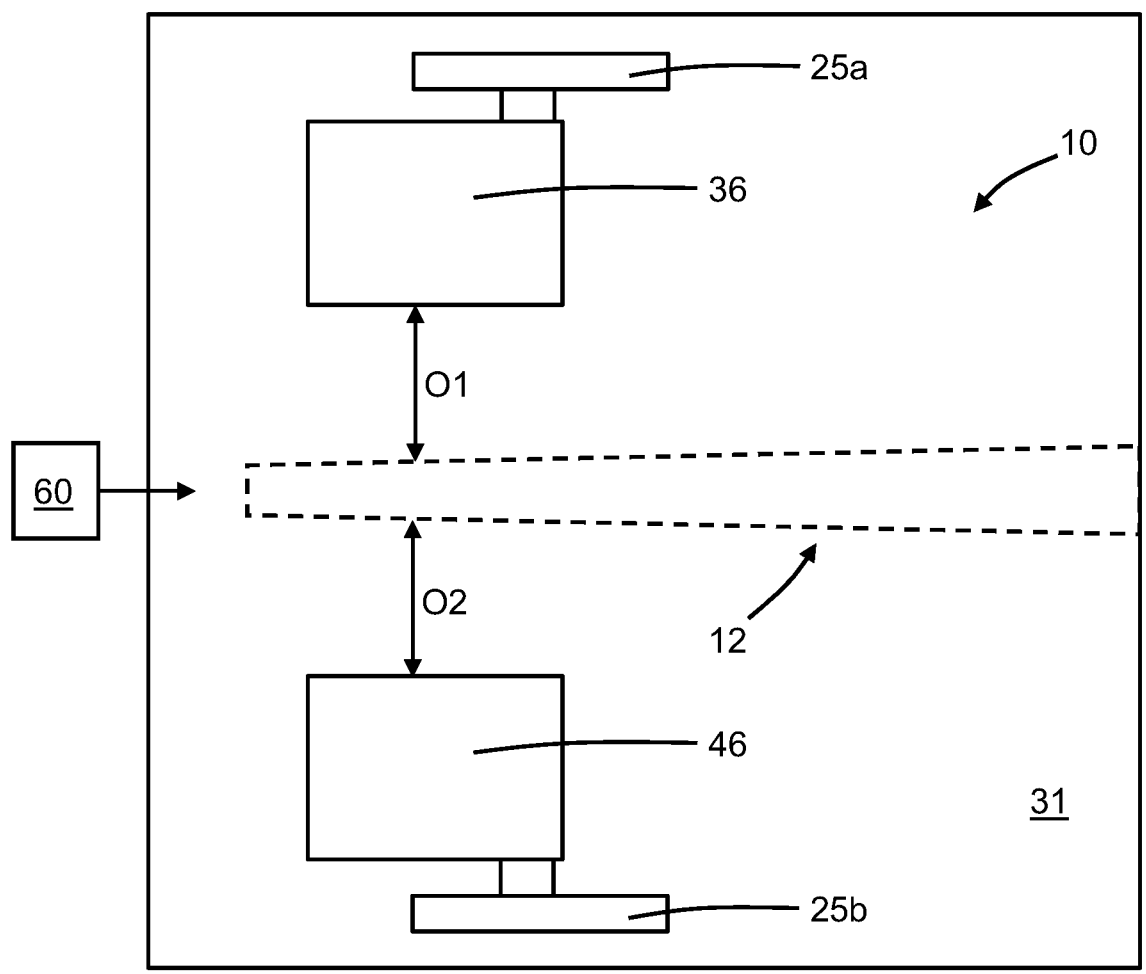
FIG. 7 is a top view of a structure in accordance with alternative embodiments of the invention.

With reference to FIG. 7 and in accordance with alternative embodiments of the invention, the metal features 32, 34, 36 may be connected to metal features in a portion 25a of the back-end-of-line stack 24 that is laterally offset from the waveguide core 12 by a distance greater than the offset O1, and the metal features 42, 44, 46 may be connected to metal features in a portion 25b of the back-end-of-line stack 24 that is laterally offset from the waveguide core 12 by a distance greater than the offset O2. For example, the metal feature 36 may be physically connected by a bridging metal feature to a metal feature in the portion 25a of the back-end-of-line stack 24, and the metal feature 46 may be physically connected by a bridging metal feature to a metal feature in the portion 25b of the back-end-of-line stack 24. The metal features in the portions 25a, 25b of the back-end-of-line stack 24 may increase the ability of the heat sink 40 to reduce the operating temperature of the section 38 of the waveguide core 12 during use.

Figure 8:
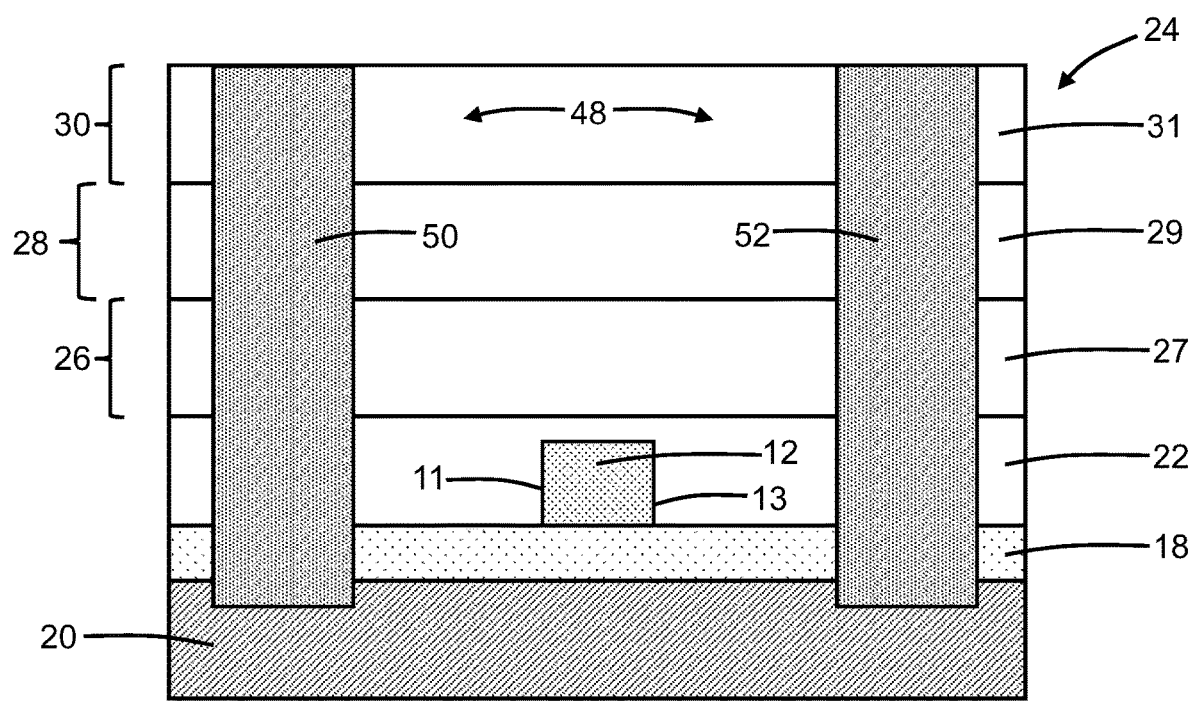
FIG. 8 is a cross-sectional view of a structure in accordance with alternative embodiments of the invention.

With reference to FIG. 8 and in accordance with alternative embodiments of the invention, a heat sink 48 may include metal features 50, 52 that are laterally positioned adjacent to the section 38 of the waveguide core 12. The metal features 50, 52 are offset in a lateral direction relative to opposite sides of the section 38 of the waveguide core 12. The metal features 50, 52 extend in a vertical direction to penetrate through the back-end-of-line stack 24 and the dielectric layer 18 to the substrate 20. The metal features 50, 52 may be formed by patterning openings extending through the back-end-of-line stack 24 and the dielectric layer 18 and then filling the openings with a metal (e.g., copper or tungsten). The connections of the metal features 50, 52 to the substrate 20 may provide conduction paths that enhance heat transfer away from the section 38 of the waveguide core 12 and thereby improve cooling during operation.

Figure 9:
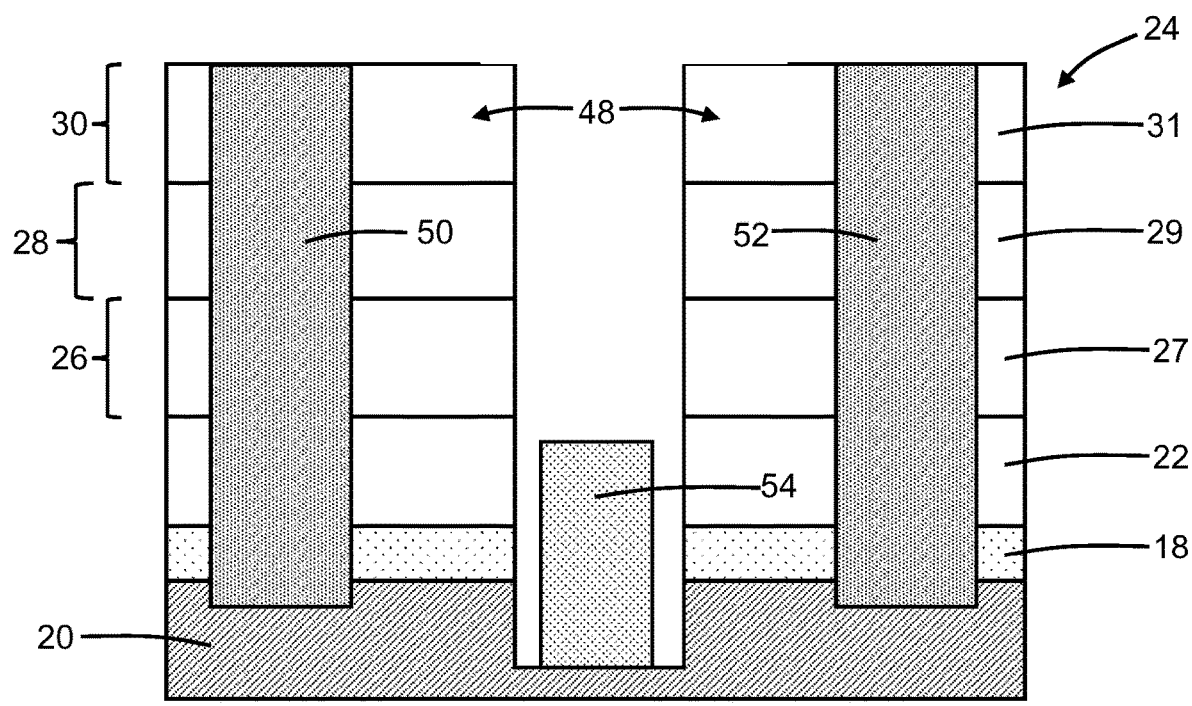
FIG. 9 is a cross-sectional view of a structure in accordance with alternative embodiments of the invention.

With reference to FIG. 9 and in accordance with alternative embodiments of the invention, the optical component represented by the waveguide core 12 may be replaced by a different type of optical component, such as a laser 54, that is located adjacent to the metal features 50, 52. In an embodiment, the laser 54 may be laterally positioned between the metal feature 50 and the metal feature 52. The laser 54 may be disposed inside a cavity that is patterned in the substrate 20. The heat sink 48 may receive heat generated by the laser 54 during operation and thereby reduce the operating temperature of the laser 54.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/− 10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may overlap if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a waveguide core including a section; and
   a back-end-of-line stack comprising a first metallization level, a second metallization level, and a heat sink, the heat sink including a first metal feature in the second metallization level, a second metal feature in a portion of the back-end-of-line stack, and a third metal feature configured to physically connect the first metal feature to the second metal feature, the heat sink positioned adjacent to the section of the waveguide core, and the first metallization level including a first dielectric layer positioned between the first metal feature and the section of the waveguide core,
   wherein the first metal feature has a first lateral offset relative to the section of the waveguide core such that the first metal feature has a non-overlapping relationship with the section of the waveguide core, the second metal feature has a second lateral offset relative to the section of the waveguide core, and the second lateral offset is greater than the first lateral offset.

2. The structure of claim 1 wherein the waveguide core comprises an edge coupler having a facet, and the heat sink is positioned adjacent to the facet.

3. The structure of claim 2 further comprising:
a light source configured to direct light toward the facet of the waveguide core.

4. The structure of claim 1 wherein the back-end-of-line stack includes a third metallization level, the second metallization level is positioned between the third metallization level and the first metallization level, and the heat sink includes a fourth metal feature in the third metallization level.

5. The structure of claim 4 wherein the heat sink includes a fifth metal feature that connects the first metal feature to the fourth metal feature.

6. The structure of claim 1 wherein the heat sink including a fourth metal feature in the second metallization level, and the fourth metal feature of the heat sink is laterally offset relative to the section of the waveguide core such that the fourth metal feature has a non-overlapping relationship with the section of the waveguide core.

7. The structure of claim 6 wherein the fourth metal feature has a third lateral offset relative to the section of the waveguide core.

8. The structure of claim 7 wherein the first lateral offset is equal to the third lateral offset.

9. The structure of claim 6 wherein the first metal feature is not connected to the fourth metal feature.

10. The structure of claim 1 wherein the waveguide core comprises silicon.

11. The structure of claim 1 wherein the first metal feature is spaced in a vertical direction from the section of the waveguide core.

12. The structure of claim 1 wherein the first metal feature, the second metal feature, and the third metal feature comprise copper.

13. The structure of claim 1 wherein the third metal feature bridges between the first metal feature and the second metal feature in the back-end-of-line stack to provide a physical connection.

14. The structure of claim 1 wherein the waveguide core has a first sidewall and second sidewall opposite to the first sidewall, and the first metal feature is disposed between the second metal feature and the first sidewall of the waveguide core.

15. The structure of claim 14 wherein the first metal feature is spaced in a vertical direction from the section of the waveguide core.

16. The structure of claim 1 further comprising:
a substrate; and
a second dielectric layer on the substrate,
wherein the waveguide core is positioned over the substrate and the second dielectric layer.

17. The structure of claim 16 further comprising:
a third dielectric layer over the waveguide core and the second dielectric layer,
wherein the waveguide core is embedded in the third dielectric layer, and the back-end-of-line stack is positioned over the third dielectric layer.

18. The structure of claim 1 wherein the first metal feature has a width, and the first lateral offset is less than the width of the first metal feature.

19. A method comprising:
forming a waveguide core; and
forming a back-end-of-line stack comprising a first metallization level, a second metallization level, and a heat sink,
wherein the heat sink includes a first metal feature in the second metallization level, a second metal feature in a portion of the back-end-of-line stack, and a third metal feature configured to physically connect the first metal feature to the second metal feature, the heat sink is positioned adjacent to a section of the waveguide core, and the first metallization level includes a dielectric layer positioned between the first metal feature and the section of the waveguide core, the first metal feature has a first lateral offset relative to the section of the waveguide core such that the first metal feature has a non-overlapping relationship with the section of the waveguide core, the second metal feature has a second lateral offset relative to the section of the waveguide core, and the second lateral offset is greater than the first lateral offset.

20. The method of claim 19 wherein the back-end-of-line stack includes a third metallization level, the second metallization level is positioned between the third metallization level and the first metallization level, and the heat sink includes a fourth metal feature formed in the third metallization level.

* * * * *